(12) United States Patent
Hayashi et al.

(10) Patent No.: US 12,492,103 B2
(45) Date of Patent: Dec. 9, 2025

(54) REMOTE OPERATION TERMINAL AND MOBILE CRANE COMPRISING REMOTE OPERATION TERMINAL

(71) Applicant: TADANO LTD., Kagawa (JP)

(72) Inventors: Hiroyuki Hayashi, Kagawa (JP); Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 1034 days.

(21) Appl. No.: 16/977,668

(22) PCT Filed: Mar. 8, 2019

(86) PCT No.: PCT/JP2019/009278
§ 371 (c)(1),
(2) Date: Sep. 2, 2020

(87) PCT Pub. No.: WO2019/172406
PCT Pub. Date: Sep. 12, 2019

(65) Prior Publication Data
US 2020/0391980 A1    Dec. 17, 2020

(30) Foreign Application Priority Data
Mar. 9, 2018    (JP) .................................. 2018-043247

(51) Int. Cl.
*B66C 13/40* (2006.01)
*B66C 13/16* (2006.01)
(Continued)

(52) U.S. Cl.
CPC .............. *B66C 13/40* (2013.01); *B66C 13/16* (2013.01); *B66C 13/46* (2013.01); *G05D 3/20* (2013.01);
(Continued)

(58) Field of Classification Search
None
See application file for complete search history.

(56) References Cited

U.S. PATENT DOCUMENTS 6,826,452 B1 * 11/2004 Holland .................. B66C 23/00
318/568.22
10,248,117 B2 * 4/2019 Stuckman ............ A63H 27/004
(Continued)

FOREIGN PATENT DOCUMENTS

DE    102012021422 A1 * 4/2014 ............. B66C 13/40
FR    2997071 A1 * 4/2014 ............. B66C 13/40
(Continued)

OTHER PUBLICATIONS

Machine translation of DE-102012021422-A1 (Year: 2014).*
(Continued)

*Primary Examiner* — Christian Chace
*Assistant Examiner* — Scott R Jagolinzer
(74) *Attorney, Agent, or Firm* — Paratus Law Group, PLLC

(57) ABSTRACT

The invention addresses the problem of providing a remote operation terminal that prevents erroneous operation while remotely operating a mobile crane and that can easily and simply remotely operate the mobile crane, and a work vehicle comprising the remote operation terminal. A remote operation terminal comprises: a terminal-side GNSS receiver; a suspended load movement manipulation tool; and a terminal-side control device. The terminal-side control device acquires the current position of a boom tip from the crane control device and the current position of the remote operation terminal from the terminal-side GNSS receiver of the remote operation terminal, and sets the reference for the
(Continued)

operation direction on a line L connecting the current position of the boom tip and the current position of the remote operation terminal.

6 Claims, 8 Drawing Sheets

(51) Int. Cl.
*B66C 13/46* (2006.01)
*B66F 9/075* (2006.01)
*B66F 11/04* (2006.01)
*G01S 19/42* (2010.01)
*G05D 3/20* (2006.01)
*H04W 4/48* (2018.01)

(52) U.S. Cl.
CPC .......... *H04W 4/48* (2018.02); *B66F 9/07581* (2013.01); *B66F 11/04* (2013.01); *G01S 19/42* (2013.01)

(56) References Cited

U.S. PATENT DOCUMENTS

| | | | | |
|---|---|---|---|---|
| 10,488,215 | B1* | 11/2019 | Yu | G01C 21/365 |
| 10,829,347 | B2* | 11/2020 | Rudy | G06T 7/0004 |
| 2008/0162005 | A1* | 7/2008 | Tang | E04G 21/04 |
| | | | | 701/50 |
| 2011/0066335 | A1* | 3/2011 | Hashimoto | B66C 13/40 |
| | | | | 701/50 |
| 2015/0334271 | A1* | 11/2015 | Hartig | F16M 11/06 |
| | | | | 348/148 |
| 2016/0031683 | A1* | 2/2016 | Fenker | B66C 13/40 |
| | | | | 212/276 |
| 2016/0117853 | A1* | 4/2016 | Zhong | B64C 39/024 |
| | | | | 345/634 |
| 2016/0216072 | A1* | 7/2016 | McNeil | F41G 5/14 |
| 2017/0091904 | A1* | 3/2017 | Ventress, Jr. | B60K 35/10 |
| 2017/0168481 | A1* | 6/2017 | Flanigan | G05D 1/0016 |
| 2017/0241097 | A1* | 8/2017 | Sharp | E01C 19/34 |
| 2018/0237274 | A1* | 8/2018 | Rantala | B66C 17/00 |
| 2019/0039862 | A1* | 2/2019 | Palberg | B66C 13/40 |
| 2019/0113975 | A1* | 4/2019 | Christensen | G05D 1/005 |
| 2020/0045238 | A1* | 2/2020 | Baig | G06F 3/04845 |
| 2020/0392746 | A1* | 12/2020 | Bertram | B25J 9/1689 |

FOREIGN PATENT DOCUMENTS

| | | | | |
|---|---|---|---|---|
| GB | 2544513 | A | * 5/2017 | ............ B66C 13/08 |
| JP | 2010-228905 | A | 10/2010 | |
| JP | 2014-145604 | A | 8/2014 | |
| JP | 2017-520843 | A | 7/2017 | |

OTHER PUBLICATIONS

Machine translation of FR-2997071 (Year: 2014).*
Alexander Morison, Perspective Control: Technology to Solve the Multiple Feeds Problem in Sensor Systems, 2010, Ohio State University (Year: 2010).*
Jun. 4, 2019, International Search Report issued for related PCT application No. PCT/JP2019/009278.
Jun. 4, 2019, International Search Opinion issued for related PCT application No. PCT/JP2019/009278.

* cited by examiner

REMOTE OPERATION TERMINAL AND MOBILE CRANE COMPRISING REMOTE OPERATION TERMINAL

CROSS REFERENCE TO PRIOR APPLICATION

This application is a National Stage Patent Application of PCT International Patent Application No. PCT/JP2019/009278 (filed on Mar. 8, 2019) under 35 U.S.C. § 371, which claims priority to Japanese Patent Application No. 2018-043247 (filed on Mar. 9, 2018), which are all hereby incorporated by reference in their entirety.

TECHNICAL FIELD

The present invention relates to a remote operation terminal and a mobile crane including the remote operation terminal.

BACKGROUND ART

To date, regarding a work vehicle that includes a work apparatus, such as a mobile crane or an aerial work platform, a work vehicle such that an actuator of the work apparatus is remotely operated and a remote operation terminal that operates the actuator of the work apparatus have been proposed. By using the remote operation terminal, an operator can perform work while checking the moving state of a suspended load at a position near the suspended load or at a target position of the suspended load that is separated from the operation apparatus of the work apparatus.

In such a work vehicle, the relative positional relationship between the work apparatus and the remote operation terminal changes in accordance with work conditions. Therefore, it is necessary for the operator, who operates the work apparatus by using the remote operation terminal, to manipulate a manipulation tool of the remote operation terminal while constantly considering the relative positional relationship with the work apparatus. Thus, a remote operation terminal that can easily and simply perform the operation of the work apparatus by causing the manipulation direction of the manipulation tool of the remote operation terminal to coincide with the working direction of the work apparatus irrespective of the relative positional relationship between the work apparatus and the remote operation terminal is known. PTL 1 describes an example of such a remote operation terminal.

In the remote operation apparatus (remote operation terminal) described in PTL 1, a signal transmitting section that transmits a laser beam or the like, having high linearity, as a reference signal is provided. In a control apparatus of the crane (work apparatus) side, a receiving section for receiving the reference signal is provided. The remote operation apparatus is configured so that the reference coordinate system of the manipulation tool coincide with the transmission direction of the reference signal. The control apparatus of the work apparatus crane side specifies the direction of the remote operation apparatus as the receiving section receives the reference signal from the remote operation apparatus, and causes the coordinate system of the crane to coincide with the coordinate system of the remote operation apparatus. Thus, because the manipulation direction of the manipulation tool of the remote operation apparatus coincides with the working direction of the crane, the operation of the crane can be easily and simply performed by using the remote operation apparatus, irrespective of the relative positional relationship between the crane and the remote operation apparatus.

However, because the mobile crane described in PTL 1 causes the reference coordinate system of the manipulation tool to coincide with the coordinate system of the work apparatus as the receiving section receives the reference signal, for a large-sized crane in which the receiving section of the mobile crane may be considerably separated from the remote operation apparatus, in a site where a large number of obstacles are present, or the like, it may not be possible for the receiving section to receive the reference signal and it may not be possible to cause the coordinate system of the mobile crane to coincide with the coordinate system of the remote operation apparatus.

CITATION LIST

Patent Literature

PTL1
   Japanese Patent Application Laid-Open No. 2010-228905

SUMMARY OF INVENTION

Technical Problem

An object of the present invention is to provide a remote operation terminal that can prevent an erroneous operation during a remote operation of a mobile crane and that allows a remote operation of the mobile crane to be easily and simply performed, and to provide a mobile crane including the remote operation terminal.

Solution to Problem

Technical problems to be solved by the present invention are as described above, and solutions to the problems will be described below.

That is, in a mobile crane according to the present invention, a remote operation terminal of a mobile crane, which includes a GNSS receiver that receives a range signal from a GNSS satellite and calculates a present position of a distal end of a boom, includes: a GNSS receiver that receives a range signal from a GNSS satellite and calculates a present position of the remote operation terminal; an operation section that remotely operates the mobile crane based on an operation direction reference; and a control section that is configured to be capable of communicating with a control apparatus of the mobile crane and that controls a working of the remote operation terminal. Preferably, the control section obtains the present position of the distal end of the boom from the control apparatus of the mobile crane, obtains the present position of the remote operation terminal from the GNSS receiver of the remote operation terminal, and sets the operation direction reference on a line that connects between the present position of the distal end of the boom and the present position of the remote operation terminal.

In the mobile crane according to the present invention, the remote control terminal is configured to be capable of setting an orientation of the operation direction reference with respect to the remote operation terminal to be any orientation.

In the mobile crane according to the present invention, the mobile crane includes an image obtaining section at the distal end of the boom, and a GNSS receiver that receives a range signal from a GNSS satellite and calculates a present position of a base end side of the boom. The control section obtains an image that the image obtaining section has obtained from the control apparatus of the mobile crane, and displays the image so that a direction of the line that connects between the present position of the distal end of the boom and the present position of the remote operation terminal coincides with a direction of the operation direction reference.

A mobile crane according to the present invention, which is a mobile crane that is remotely operated, includes: a GNSS receiver that receives a range signal from a GNSS satellite and calculates a present position of a distal end of a boom; and a remote operation terminal including an operation section that remotely operates the mobile crane based on an operation direction reference, a GNSS receiver that receives a range signal from a GNSS satellite and calculates a present position of the remote operation terminal, and a control section that is configured to be capable of communicating with a control apparatus of the mobile crane and that controls a working of the mobile crane. The remote operation terminal obtains the present position of the distal end of the boom from the control apparatus of the mobile crane, obtains the present position of the remote operation terminal from the GNSS receiver of the remote operation terminal, and sets the operation direction reference on a line that connects between the present position of the distal end of the boom and the present position of the remote operation terminal. The control apparatus obtains the present position of the distal end of the boom from the GNSS receiver of the mobile crane, obtains the present position of the remote operation terminal from the remote operation terminal, sets the operation direction reference on a line that connects between the present position of the distal end of the boom and the present position of the remote operation terminal, and causes the work apparatus to work based on an operation signal with reference to the operation direction reference that is obtained from the remote operation terminal.

Advantageous Effects of Invention

The present invention has the following advantageous effects.

With the mobile crane according to the present invention, when an operator manipulates to incline the manipulation tool in a state in which the operator is directing the remote operation terminal toward the distal end of the boom of the mobile crane, the distal end of the boom moves in the manipulation direction. Therefore, the operator does not fail to recognize the working direction of the crane with respect to the manipulation direction of the manipulation tool during a remote operation. Thus, a misoperation during remote operation of the work apparatus can be prevented, and remote operation of the work apparatus can be performed easily and simply.

With the mobile crane according to the present invention, the direction of operation direction reference is set in a direction that an operator desires. Therefore, the operator can easily operate the crane in consideration of surrounding situations and operation conditions. Thus, a misoperation during a remote operation of the work apparatus can be prevented, and the remote operation of the crane can be performed easily and simply.

With the mobile crane according to the present invention, the image from the distal end of the boom is displayed in alignment with the direction of operation direction reference in remote operation terminal. Therefore, even when checking the image, the operator does not fail to recognize the working direction of the work apparatus with respect to the inclination direction of the operation section during an operation. Thus, a misoperation during remote operation of the work apparatus can be prevented, and remote operation of the work apparatus can be performed easily and simply.

DESCRIPTION OF EMBODIMENTS

Hereafter, referring to FIGS. 1 and 2, crane 1, which is a mobile crane (rough-terrain crane) according to an Embodiment 1 of the present invention, will be described. Although a crane (rough-terrain crane) is described as an example of a work vehicle in the present embodiment, the work vehicle may be an all-terrain crane, a truck crane, a cargo crane, an aerial work platform, or the like.

Figure 1:
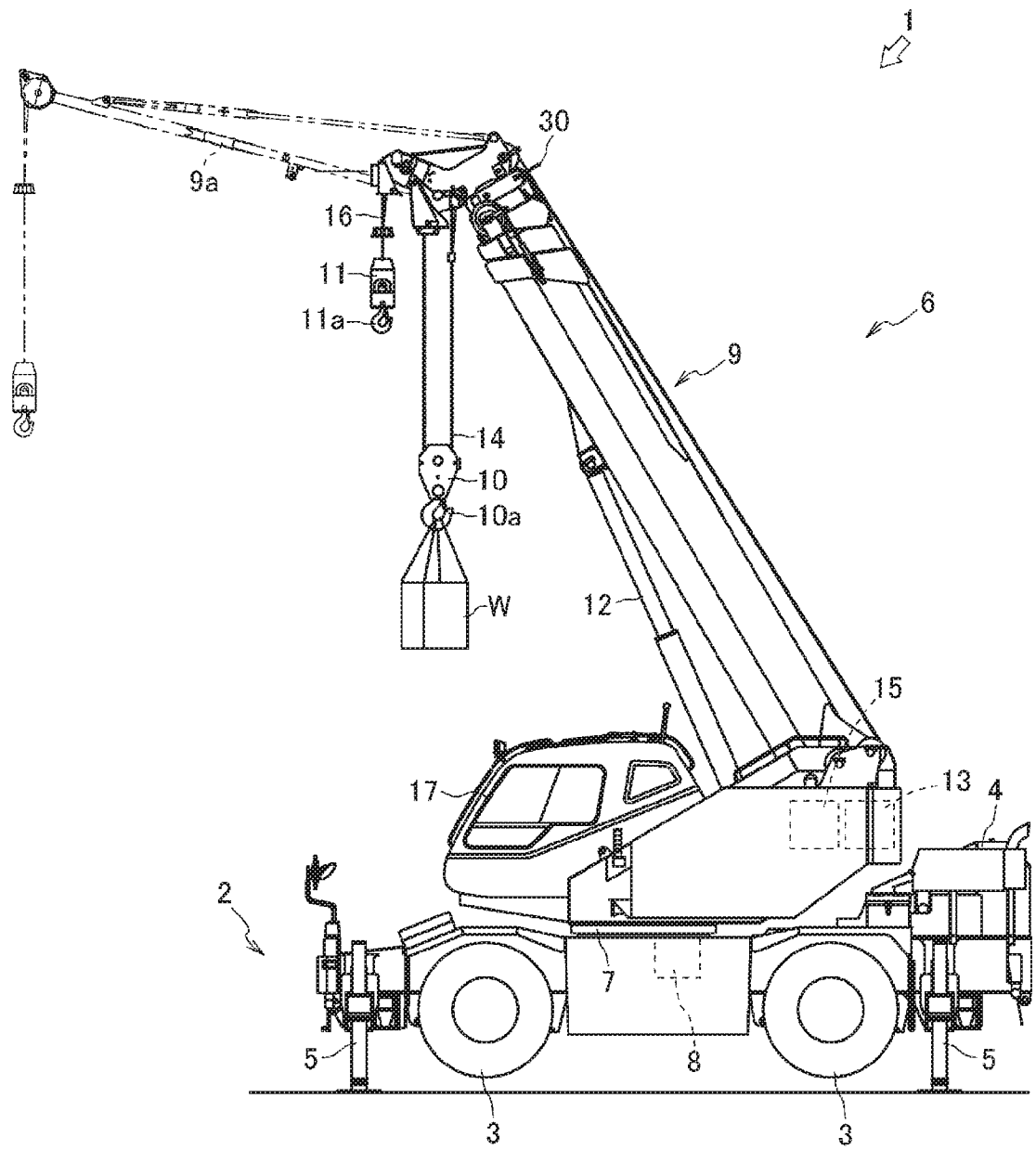
FIG. 1 is a side view illustrating the overall structure of a crane.

As illustrated in FIG. 1, crane 1 is a mobile crane that can move to any place. Crane 1 includes vehicle 2, crane apparatus 6 that is a work apparatus, and remote operation terminal 32 (see FIG. 2) that can remotely operate crane apparatus 6.

Vehicle 2 transports crane apparatus 6. Vehicle 2 has a plurality of wheels 3 and travels by using engine 4 as the power source. Outriggers 5 are provided in vehicle 2. Outriggers 5 are composed of extension beams that can be extended by hydraulic pressure to both sides of vehicle 2 in the width direction and hydraulic jack cylinders that can be extended in a direction perpendicular to the ground. Vehicle 2 can expand the workable area of crane 1 by extending outriggers 5 in the width direction of vehicle 2 and by grounding the jack cylinders.

Crane apparatus 6 suspends load W by a wire rope. Crane apparatus 6 includes swivel table 7, boom 9, jib 9a, main hook block 10, sub-hook block 11, luffing hydraulic cylinder 12, main winch 13, main wire rope 14, sub-winch 15, sub-wire rope 16, cabin 17, and the like.

Swivel table 7 configures crane apparatus 6 to be swivelable. Swivel table 7 is provided on a frame of vehicle 2 via an annular bearing. Swivel table 7 is configured to be rotatable around the center of the annular bearing. Hydraulic swivel motor 8, which is an actuator, is provided on swivel table 7. Swivel table 7 is configured to be swivelable by hydraulic swivel motor 8 in one direction and in the other direction.

Hydraulic swivel motor 8, which is an actuator, is rotationally operated by swivel valve 23 (see FIG. 2), which is an electromagnetic proportional switching valve. Swivel valve 23 can control the flow rate of hydraulic fluid supplied to hydraulic swivel motor 8 to be any flow rate. That is, swivel table 7 is configured to be controllable by hydraulic swivel motor 8, which is rotationally operated by swivel valve 23, to swivel at any swivel speed. Swivel sensor 27 (see FIG. 2) that detects the swivel position (angle) and the swivel speed of swivel table 7 is provided on swivel table 7.

Boom 9 supports a wire rope in a state in which the wire rope can suspend load W. Boom 9 is composed of a plurality of boom members. A base end of a base boom member of boom 9 is swingably provided at substantially the center of swivel table 7. Boom 9 is configured to be extendable and retractable in the axial direction by moving each of the boom members by using an extension/retraction hydraulic cylinder (not shown), which is an actuator. Jib 9a is provided in boom 9. Jib 9a is supported by a jib support portion, which is provided in the base boom member of boom 9, in a posture along the base boom member. A base end of jib 9a is configured to be capable of being coupled to a jib support portion of a top boom member.

The extension/retraction hydraulic cylinder, which is an actuator, is operated to extend and retract by extension/retraction valve 24 (see FIG. 2), which is an electromagnetic proportional switching valve. Extension/retraction valve 24 can control the flow rate of hydraulic fluid supplied to the extension/retraction hydraulic cylinder to be any flow rate. In boom 9, extension/retraction sensor 28 that detects the length of boom 9, a weight sensor that detects the weight of load W, and the like are provided.

Camera 9b (see FIG. 2), which is an image-i obtaining section, takes an image of load W and features around load W. Camera 9b is provided at a distal end portion of boom 9 or near the distal end of boom 9. Camera 9b is configured to be capable of taking, from vertically above load W, an image of load W and features and geography around crane 1.

Main hook block 10 and sub-hook block 11 suspend load W. In main hook block 10, a plurality of hook sheaves over which main wire rope 14 is looped, and main hook 10a that suspends load W are provided. Sub-hook 11a, which suspends load W, is provided in sub-hook block 11.

Luffing hydraulic cylinder 12, Which is an actuator, luffs up and tuffs down boom 9, and maintains the posture of boom 9. An end portion of a cylinder portion of luffing hydraulic cylinder 12 is swingable coupled to swivel table 7, and an end portion of a rod portion of luffing hydraulic cylinder 12 is swingably coupled to the base boom member of boom 9. Luffing hydraulic cylinder 12 is operated to extend and retract by luffing valve 25 (see FIG. 2), which is an electromagnetic proportional switching valve. Luffing valve 25 can control the flow rate of hydraulic fluid supplied to luffing hydraulic cylinder 12 to be any flow rate. Luffing sensor 29 (see FIG. 2) that detects the luffing angle of boom 9 is provided in boom 9.

Main winch 13 and sub-winch 15 pull in (wind up) and let out (wind out) main wire rope 14 and sub-wire rope 16. Main winch 13 is configured so that a main drum, around which main wire rope 14 is wound, is rotated by a main hydraulic motor (not shown), which is an actuator; and sub-winch 15 is configured so that a sub drum, around which sub-wire rope 16 is wound, is rotated by a sub-hydraulic motor (not shown), which is an actuator.

Figure 2:
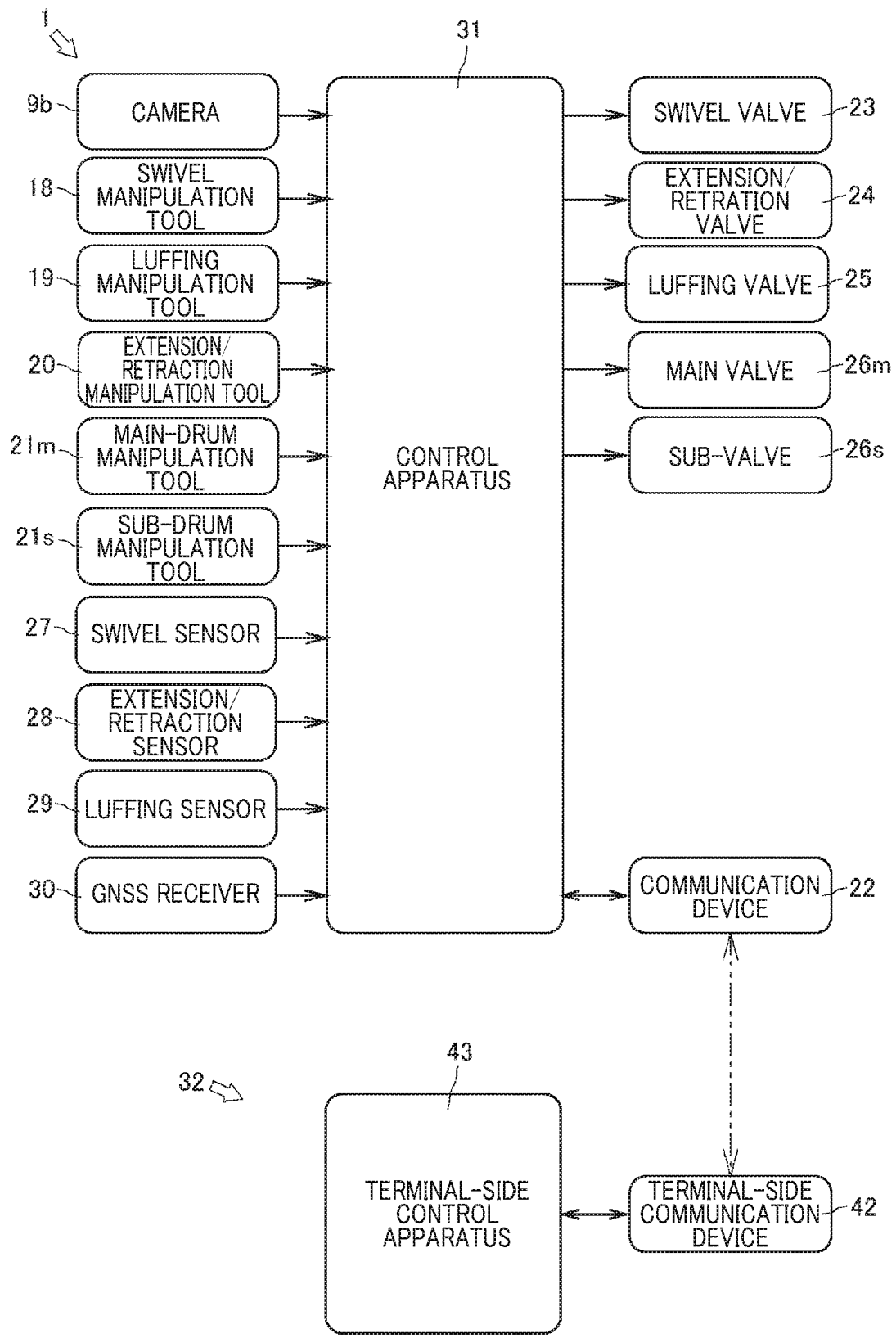
FIG. 2 is a block diagram illustrating the control configuration of the crane.

The main hydraulic motor is rotationally operated by main valve 26m, which is an electromagnetic proportional switching valve (see FIG. 2). Main winch 13 controls the main hydraulic motor by using main valve 26m, and is configured to be operable at any pull-in speed and at any let-out speed. Likewise, sub-winch 15 controls the main hydraulic motor by using sub-valve 26s (see FIG. 2), which is an electromagnetic proportional switching valve, and is configured to be operable at any pull-in speed and at any let-out speed.

Cabin 17 covers the operator's cab. Cabin 17 is mounted on swivel table 7. An operator's cab (not shown) is provided. In the operator's cab, a manipulation tool for manipulating travelling of vehicle 2, swivel manipulation tool 18 for manipulating crane apparatus 6, luffing manipulation tool 19, extension/retraction manipulation tool 20, main-drum manipulation tool 21m, sub-drum manipulation tool 21s, and the like are provided (see FIG. 2). Swivel manipulation tool 18 can manipulate hydraulic swivel motor 8. Luffing manipulation tool 19 can manipulate luffing hydraulic cylinder 12. Extension/retraction manipulation tool 20 can manipulate the extension/retraction hydraulic cylinder. Main-drum manipulation tool 21m can manipulate the main hydraulic motor. Sub-drum manipulation tool 21s can manipulate the sub-hydraulic motor.

Communication device 22 (see FIG. 2) receives a control signal from remote operation terminal 32, and transmits control information and the like from crane apparatus 6. Communication device 22 is provided in cabin 17. Communication device 22 is configured so that, when receiving a control signal and the like from remote operation terminal 32, communication device 22 transfers the communication signal and the like to control apparatus 31 via a communication line (not shown). Communication device 22 is configured to transfer control information from control apparatus 31 and image i from camera 9b to remote operation terminal 32 via a communication line (not shown).

GNSS receiver 30 (see FIG. 2), which is a receiver of a global navigation satellite system, receives a range radio wave from a satellite, and calculates the latitude, the longitude, and the altitude, which are the positional coordinates of the receiver. GNSS receiver 30 is provided at each of the distal end of boom 9 and cabin 17 (hereafter, the GNSS receivers provided at the distal end of boom 9 and cabin 17 will be collectively referred to as "GNSS receiver 30"). That is, crane 1 can obtain the positional coordinates of the distal end of boom 9 and the positional coordinates of cabin 17 by using GNSS receiver 30. Moreover, crane 1 can calculate the disposition of boom 9 with respect to the distal end of boom 9 (the position of load W) by using GNSS receiver 30. Also in a case where GNSS receiver 30 is attached to vehicle 2, GNSS receiver 30 can obtain the positional coordinates of the distal end of boom 9 and the positional coordinates of cabin 17 from postural information of vehicle 2.

As illustrated in FIG. 2, control apparatus 31 controls the actuators of crane 1 via operation valves. Control apparatus 31 is provided in cabin 17. In reality, control apparatus 31 may be configured so that a CPU, a ROM, a RAM, an HDD, and the like are connected by a bus; or may be composed of a one-chip LSI or the like. In control apparatus 31, various programs and data for controlling the operations of actuators, switching valves, sensors, and the like are stored.

Control apparatus 31 is connected to camera 9b, swivel manipulation tool 18, luffing manipulation tool 19, extension/retraction manipulation tool 20, main-drum manipulation tool 21m, and sub-drum manipulation tool 21s; and can obtain image i taken by camera 9b and the manipulation amount of each of swivel manipulation tool 18, luffing manipulation tool 19, main-drum manipulation tool 21m, and sub-drum manipulation tool 21s.

Control apparatus 31 is connected to communication device 22, can obtain a control signal from remote operation terminal 32, and can transmit control information from crane apparatus 6, image i from camera 9b, and the like.

Control apparatus 31 is connected to swivel valve 23, extension/retraction valve 24, luffing valve 25, main valve 26m, and sub-valve 26s; and can transfer a control signal to swivel valve 23, luffing valve 25, main valve 26m, and sub-valve 26s.

Control apparatus 31 is connected to swivel sensor 27, extension/retraction sensor 28, and luffing sensor 29 and can obtain the swivel position of swivel table 7, a boom length, a luffing angle, and the weight of load W.

Control apparatus 31 is connected to GNSS receiver 30, and can obtain the positional coordinates of the distal end of boom 9 and the positional coordinates of cabin 17. Control apparatus 31 can calculate the disposition of boom 9 with respect to h distal end of boom 9 (load W) from the obtained positional coordinates of the distal end of boom 9 and the positional coordinates of cabin 17. Control apparatus 31 can determine the orientation of image i by associating the obtained image i with the disposition of boom 9.

Based on the manipulation amount of each of swivel manipulation tool 18, luffing manipulation tool 19, main-drum manipulation tool 21m, and sub-drum manipulation tool 21s, control apparatus 31 generates a control signal corresponding to each of the manipulation tools.

Crane 1, which is configured as described above, can move crane apparatus 6 to any position by causing vehicle 2 to travel. Crane 1 can increase the lift and the work radius of crane apparatus 6 by luffing up boom 9 at any luffing angle by using luffing hydraulic cylinder 12 due to operation of luffing manipulation tool 19, and by increasing the length of boom 9 to any length due to operation of extension/retraction manipulation tool 20. Crane 1 can transport load W by suspending load W by using sub-drum manipulation tool 21s or the like and by swiveling swivel table 7 due to a manipulation of swivel manipulation tool 18.

Next, referring to FIGS. 3 to 5A and 5B, remote operation terminal 32 will be described.

Figure 3:
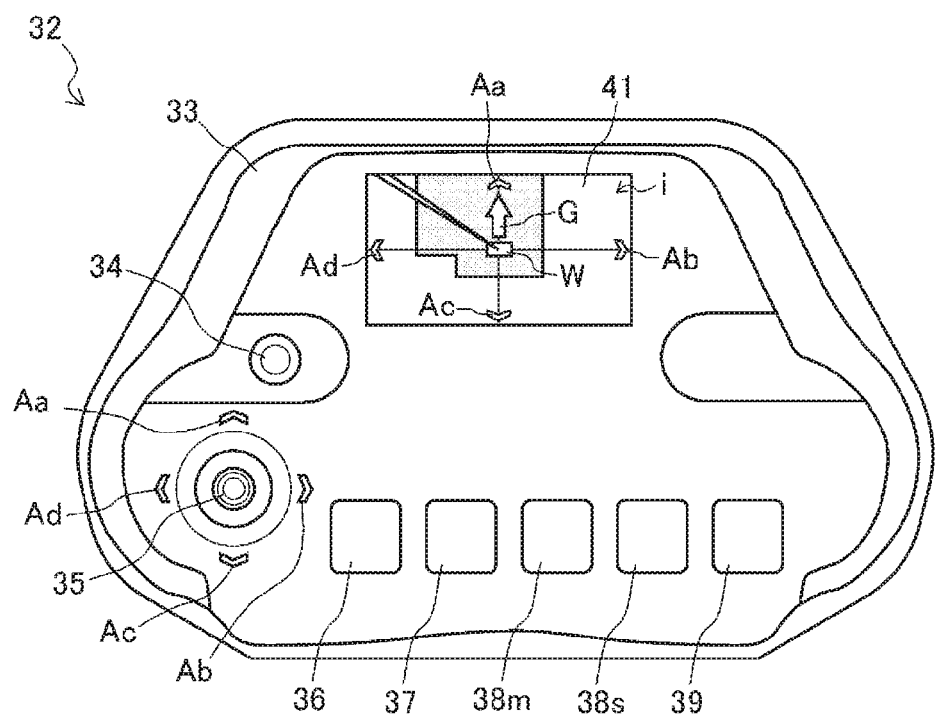
FIG. 3 is a plan view illustrating the schematic configuration of a remote operation terminal.

As illustrated in FIG. 3, remote operation terminal 32 is used when remotely operating crane 1. Remote operation terminal 32 includes housing 33, suspended-load movement manipulation tool 35 that is a first operation section provided on the operation panel of housing 33, reference-change manipulation tool 34, terminal swivel manipulation tool 36, terminal-side extension/retraction manipulation tool 37, terminal-side main drum manipulation tool 38m, terminal-side sub-drum manipulation tool 38s, terminal-side luffing manipulation tool 39, terminal-side GNSS receiver 40 (see FIG. 4) display section 41, terminal-side control apparatus 43, terminal-side communication device 43 (see FIG. 4), and the like. Remote operation terminal 32 sets an operation direction reference Bo by using reference-change manipulation tool 34 and transmits, to crane apparatus 6, a control signal of an operation valve of each actuator that moves load W, in response to a manipulation of suspended-load movement manipulation tool 35 or each terminal-side manipulation tool.

Operation direction reference Bo of remote operation terminal 32 is a reference for setting the movement direction of load W, which is moved due to an inclination manipulation of suspended-load movement manipulation tool 35 in any direction. To be specific, operation direction reference Bo is set along line L that connects between the positional coordinates of the distal end of boom 9 and the positional coordinates of remote operation terminal 32. That is, operation direction reference Bo is a reference for calculating the movement direction of load W (the working direction of the distal end of boom 9) moved by crane apparatus 6 of crane 1 and is a common reference for calculating inclination angle $\theta 2$ when suspended-load movement manipulation tool 35 is manipulated to incline in any direction. In the present embodiment, operation direction reference Bo of remote operation terminal 32 is set, as initial setting, to the upward direction when facing the operation panel of housing 33 (hereafter, referred to simply as "the upward direction on remote operation terminal 32) (see the broken-line arrow).

Housing 33 is a main component of remote operation terminal 32. Housing 33 is configured as a case having a size that an operator can hold by hand. On the operation panel of housing 33, suspended-load movement manipulation tool 35, reference-change manipulation tool 34, terminal-side swivel manipulation tool 36, terminal-side extension/retraction manipulation tool 37, terminal-side main drum manipulation tool 38m, terminal-side sub-drum manipulation tool 38s, terminal-side hitting manipulation tool 39, terminal-side GNSS receiver 40, display section 41, and terminal-side communication device 42 (see FIGS. 2 and 4) are provided.

An instruction to remote operation terminal 32 for changing the direction of operation direction reference Bo is input to reference-change manipulation tool 34. Reference-change manipulation tool 34 is composed of a rotary knob that protrudes from the operation panel of housing 33, and a sensor (not shown) that detects the rotation direction and the rotation amount, which are the rotation positions of the rotary knob. Reference-change manipulation tool 34 is configured so that the rotary knob is rotationally operable in any direction. Reference-change manipulation tool 34 is configured to transmit, as the rotary knob is operated, to terminal-side control apparatus 43 a signal about correction angle $\theta 1$ (see FIG. 5A) that is an angle between the upward direction of remote operation terminal 32 and operation direction reference Bo that is the rotation position of the rotary knob.

An instruction for moving load W in any direction and at any speed along any horizontal plane is input to suspended-load movement manipulation tool 35, which is a first operation section. Suspended-load movement manipulation tool 35 is composed of a manipulation stick that stands substantially vertically on the operation panel of housing 33, and a sensor (not shown) that detects the inclination direction and the inclination amount of the manipulation stick. Suspended-load movement manipulation tool 35 is configured so that the manipulation stick can be manipulated to incline in any direction. Suspended-load movement manipulation tool 35 is configured to transmit to terminal-side control apparatus 43 a signal about inclination angle $\theta 2$ (see FIG. 5B) between the upward direction of remote operation terminal 32 and the inclination direction of the manipulation stick detected by the sensor. In suspended-load movement manipulation tool 35, arrow Aa indicating an upward direction when facing the operation panel of housing 33, arrow Ab indicating a rightward direction when facing the operation panel, arrow Ac indicating a downward direction when facing the operation panel, and arrow Ad indicating a leftward direction when facing the operation panel are displayed as guidelines of inclination angle $\theta 2$ of suspended-load movement manipulation tool 35.

An instruction for swiveling crane apparatus 6 in any movement direction at any movement speed is input to terminal-side swivel manipulation tool 36. Terminal-side swivel manipulation tool 36 is composed of a manipulation stick that stands substantially perpendicular to the operation panel of housing 33, and a sensor (not shown) that detects the inclination direction and the inclination amount of the manipulation stick. Terminal-side swivel manipulation tool 36 is configured to be capable of being inclined in a direction for instructing leftward swiveling and a direction for instructing rightward swiveling.

An instruction for extending and retracting boom 9 at any speed is input to terminal-side extension/retraction manipulation tool 37. Terminal-side extension/retraction manipulation tool 37 is composed of a manipulation stick that stands on the operation panel of housing 33, and a sensor (not shown) that detects the inclination direction and inclination amount of the manipulation stick. Terminal-side extension/retraction manipulation tool 37 is capable of being inclined in each of a direction for instructing extension and a direction for instructing retraction.

An instruction for rotating main winch 13 at any speed and in any direction is input to terminal-side main-drum manipulation tool 38m. Terminal-side main-drum manipulation tool 38m is composed of a manipulation stick stands on the operation panel of housing 33, and a sensor (not shown) that detects the inclination direction and inclination amount of the manipulation stick. Terminal-side main-drum manipulation tool 38m is configured to be capable of being inclined in a direction for instructing winding up of main wire rope 14 and in a direction for instructing winding down of main wire rope 14. Terminal-side sub-drum manipulation tool 38s is also configured in the same way as described above.

An instruction for luffing boom 9 at any speed is input to terminal-side luffing manipulation tool 39. Terminal-side luffing manipulation tool 39 is composed of a manipulation stick that stands on the operation panel of housing 33, and a sensor (not shown) that detects the inclination direction and inclination amount of the manipulation stick. Terminal-side luffing manipulation tool 39 is configured to be capable of being inclined in a direction for instructing luffing up and a direction for instructing luffing down.

Terminal-side GNSS receiver 40, which is a receiver of a global navigation satellite system, receives a range radio wave from a satellite, and calculates the latitude, the longitude, and the altitude, which are the positional coordinates of the receiver. Terminal-side GNSS receiver 40 is provided in remote operation terminal 32. That is, remote operation terminal 32 can obtain positional coordinates by using terminal-side GNSS receiver 40.

Display section 41 displays various information items such as postural information of crane 1, information of load W, and the like. Display section 41 is composed of an image display apparatus such as a liquid-crystal panel or the like. Display section 41 is provided on the operation panel of housing 33. In display section 41, reference figure G representing an arrow is displayed as an image that represents the direction of operation direction reference Bo with respect to remote operation terminal 32. Reference figure G is rotationally displayed in correspondence with the rotation position of reference-change manipulation tool 34. That is, on display section 41, the relative positional relationship of operation direction reference Bo (see the solid-line arrow) with respect to remote operation terminal 32, on which the rotation direction and the rotation amount of reference-change manipulation tool 34 are reflected, is displayed.

Moreover, on display section 41, so as to surround reference figure G, arrow Aa indicating an upward direction when facing the operation panel of housing 33, arrow Ab indicating a rightward direction when facing the operation panel, arrow Ac indicating a downward direction when facing the operation panel, and arrow Ad indicating a leftward direction when facing the operation panel are displayed as guidelines of inclination angle θ2 of suspended-load movement manipulation tool 35.

Figure 4:
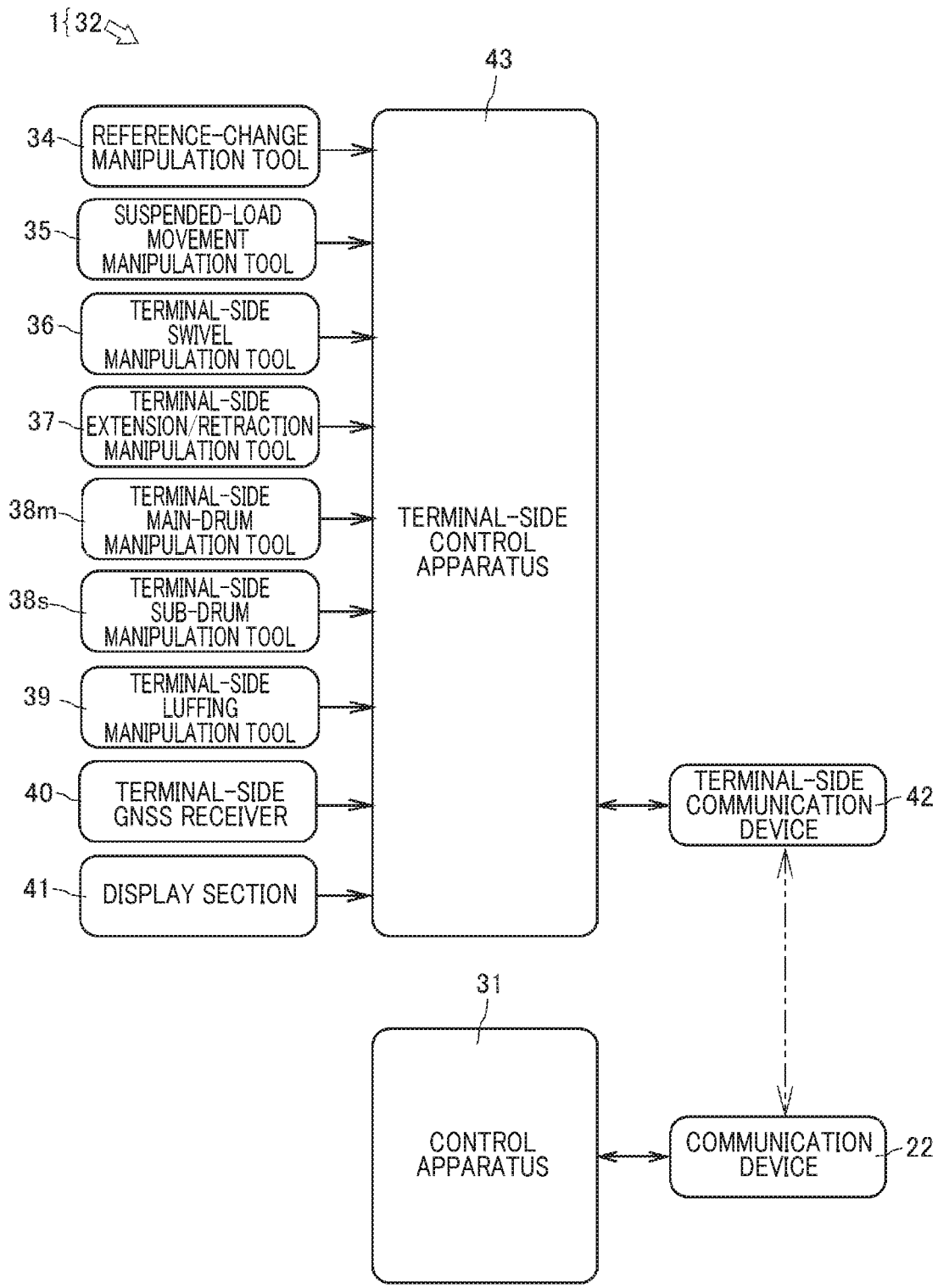
FIG. 4 is a block diagram illustrating the control configuration of the remote control terminal.

As illustrated in FIG. 4, terminal-side communication device 42 receives control information and the like of crane apparatus 6, and transmits control information and the like from remote operation terminal 32. Terminal-side communication device 42 is provided inside of housing 33. Terminal-side communication device 42 is configured so that, when receiving image i, a control signal, and the like from crane apparatus 6, terminal-side communication device 42 transfers these to terminal-side control apparatus 43. Terminal-side communication device 42 is configured to transfer control information from terminal-side control apparatus 43 to crane apparatus 6 via communication device 22 of crane 1.

Terminal-side control apparatus 43, which is a control section, controls remote operation terminal 32. Terminal-side control apparatus 43 is provided in housing 33 of remote operation terminal 32. In reality, terminal-side control apparatus 43 may be configured so that a CPU, a ROM, a RAM, an HDD, and the like are connected by a bus; or may be a one-chip LSI or the like. Terminal-side control apparatus 43 stores programs and data for controlling the operations of suspended-load movement manipulation tool 35, reference-change manipulation tool 34, terminal-side swivel manipulation tool 36, terminal-side extension/retraction manipulation tool 37, terminal-side main-drum manipulation tool 38m, terminal-side sub-drum manipulation tool 38s, terminal-side luffing manipulation tool 39, terminal-side GNSS receiver 40, display section 41, terminal-side receiver 42, and the like.

Terminal-side control apparatus 43 is connected to suspended-load movement manipulation tool 35, terminal-side swivel manipulation tool 36, terminal-side extension/retraction manipulation tool 37, terminal-side main drum manipulation tool 38m, terminal-side sub-drum manipulation tool 38s, and terminal-side luffing manipulation tool 39; and can obtain operation signals of the inclination directions and the inclination amounts of the manipulation sticks of these manipulation tools. Terminal-side control apparatus 43 is connected to reference-change manipulation tool 34, and can obtain an operation signal representing the rotation direction and the rotational angle, which are rotation positions, of reference-change manipulation tool 34. Terminal-side control apparatus 43 is connected to terminal-side GNSS receiver 40, and can obtain positional coordinates from terminal-side GNSS receiver 40.

Terminal-side control apparatus 43 can generate, from the operation signals of the operations sticks obtained from the sensors of terminal-side swivel manipulation tool 36, terminal-side extension/retraction manipulation tool 37, terminal-side main-drum manipulation tool 38m, terminal-side sub-drum manipulation tool 38s, and terminal-side luffing manipulation tool 39, controls signals of corresponding swivel valve 23, extension/retraction valve 24, luffing valve 25, main valve 26m, and sub-valve 26s.

Terminal-side control apparatus 43 is connected to display apparatus 41, and can display, on display section 41, image i from crane apparatus 6 and various information items. Terminal-side control apparatus 43 can make reference figure G (or the reference coordinate axis) to be rotationally displayed in correspondence with the rotation direction and the correction angle θ1 the rotation position of the rotary knob of reference-change manipulation tool 34. Terminal-side control apparatus 43 is connected to terminal-side communication device 42, and can transmit various information items to and receive various information items from communication device 22 of crane apparatus 6 via terminal-side communication device 42.

Figure 5A:
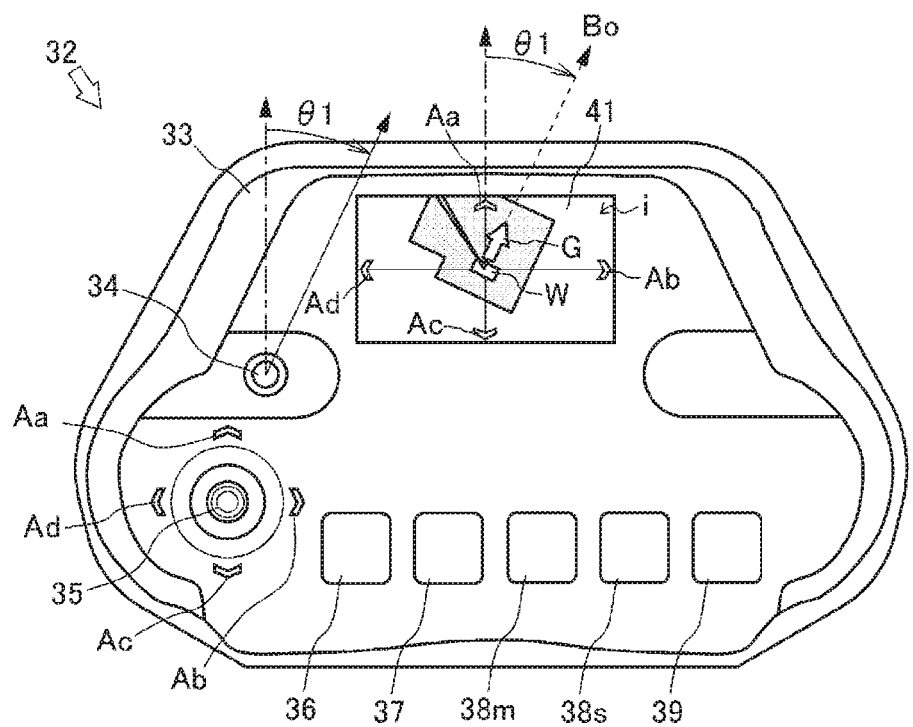
FIG. 5A is a partial enlarged view illustrating an operation direction reference when a reference-change manipulation tool of the remote operation terminal is operated.

As illustrated in FIG. 5A, terminal-side control apparatus 43 (see FIG. 4) relatively rotates operation direction reference Bo with respect to remote operation terminal 32 based on a rotation direction that is a rotation position obtained from rotationally operated reference-change manipulation tool 34 and an operation signal about correction angle θ1 that is an angle with respect to the upward direction of remote operation terminal 32. For example, when reference-change manipulation tool 34 is rotationally manipulated in one direction (the clockwise direction in FIG. 5A) from the upward direction of remote operation terminal 32 to the position of the correction angle θ1, terminal-side control apparatus 43 rotates operation direction reference Bo in one direction as a correction direction, and corrects the direction of operation direction reference Bo. At this time, terminal-side control apparatus 43 rotates reference figure G displayed on display section 41 from the upward direction of remote operation terminal 32, which is the direction of operation direction reference Bo, in one direction to the positon of correction angle θ1, based on an operation signal about correction angle θ1 from reference-change manipulation tool 34. At the same time, terminal-side control apparatus 43 performs, in correspondence with a manipulation of reference-change manipulation tool 34, relatively rotation image i with respect to remote operation terminal 32 so that the display direction of image i displayed on display section 41 coincides with the direction of operation direction reference Bo.

Figure 5B:
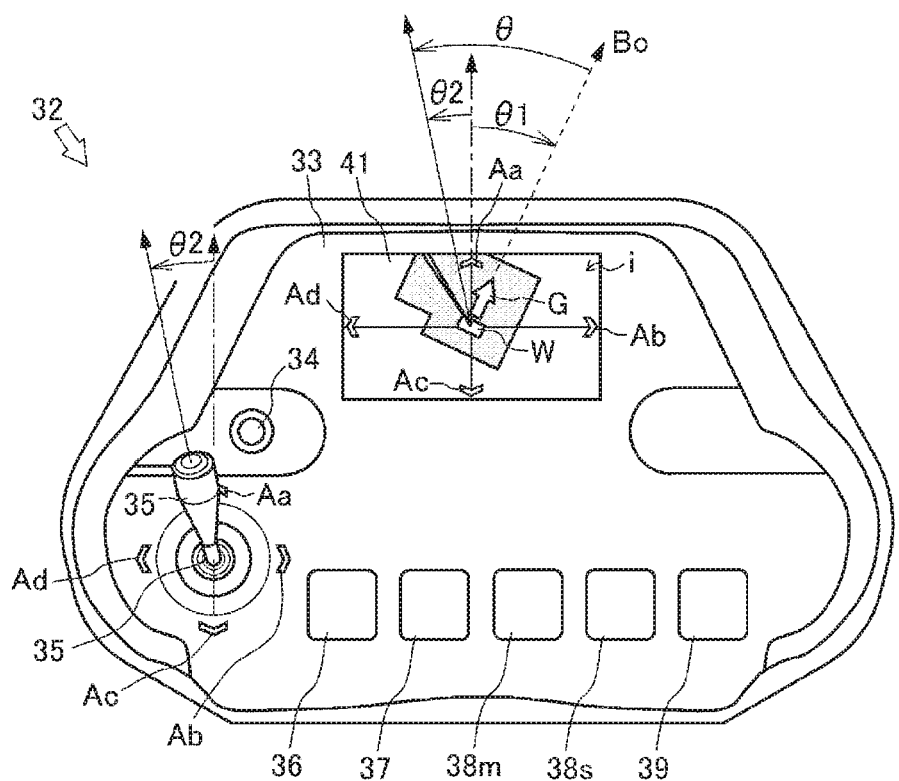
FIG. 5B is a partial enlarged view illustrating a transport direction of a load when a suspended-load movement manipulation tool of the remote operation terminal is operated.

As illustrated in FIG. 5B, terminal-side control apparatus 43 (see FIG. 4) calculates the movement direction from operation direction reference Bo and the movement speed of load W, based on inclination angle θ2, which is the angle between the upward direction of remote operation terminal 32 and the inclination direction of the manipulation stick, obtained from suspended-load movement manipulation tool 35 and an operation signal about the inclination direction and the inclination amount of the manipulation stick. For example, in a state in which the direction of operation direction reference Bo is rotated in one direction (the clockwise direction in FIG. 5A) from the upward direction of remote operation terminal 32 to the position of correction angle θ1, when suspended-load movement manipulation tool 35 is manipulated to incline by inclination angle θ2 toward one of the left and right sides of the upward direction of remote operation terminal 32, terminal-side control apparatus 43 calculates movement angle θ of load W from the upward direction of remote operation terminal 32=correction angle θ1+inclination angle θ2, from correction angle θ1, the correction direction, and inclination angle θ2. Terminal-side control apparatus 43 calculates a control signal that causes load W to move in the direction of movement angle θ at a movement speed corresponding to the inclination amount.

Next, referring to FIGS. 6 to 9, setting of operation direction reference Bo in remote operation terminal 32, and control of crane apparatus 6 by using remote operation terminal 32 will be described. As directions of crane 1, a direction in which vehicle 2 moves forward is defined as the forward direction, a direction in which the vehicle moves backward is defined as the backward direction, a direction toward the right side when facing the forward direction is defined as the rightward direction, and a direction toward the left side when facing the forward direction is defined as the leftward direction. In the present embodiment, it is assumed that operation direction reference Bo of remote operation terminal 32 (broken line arrows in FIGS. 5A and 5B to 9) is set to the upward direction of remote operation terminal 32 (the direction of arrows Aa displayed on suspended-load movement manipulation tool 35 and display section 41). In addition, it is assumed that, regarding correction angle θ1 and inclination ogle θ2, the counterclockwise direction from the direction of arrow Aa is defined as the "+" direction, the clockwise direction from the direction of arrow Aa is defined as "−" direction, and these signs are used for addition and subtraction of angles.

Operation direction reference Bo of remote operation terminal 32 is set along line L that connects between the positional coordinates of the distal end of boom 9 and the positional coordinates of remote operation terminal 32. That is, operation direction reference Bo is a reference for calculating the movement direction of load W (the working direction of the distal end of boom 9) in which crane apparatus 6 of crane 1 moves load W, and is a common reference for calculating a control signal of crane apparatus 6 from an operation signal when suspended-load movement manipulation tool 35 is manipulated to incline at inclination angle θ2, in the present embodiment, remote operation terminal 32 is set, as initial setting, so that load W moves in the direction of operation direction reference Bo (see the broken-line arrow) when suspended-load movement manipulation tool 35 is manipulated to incline in the upward direction of remote operation terminal 32 (direction of arrow Aa).

Figure 6:
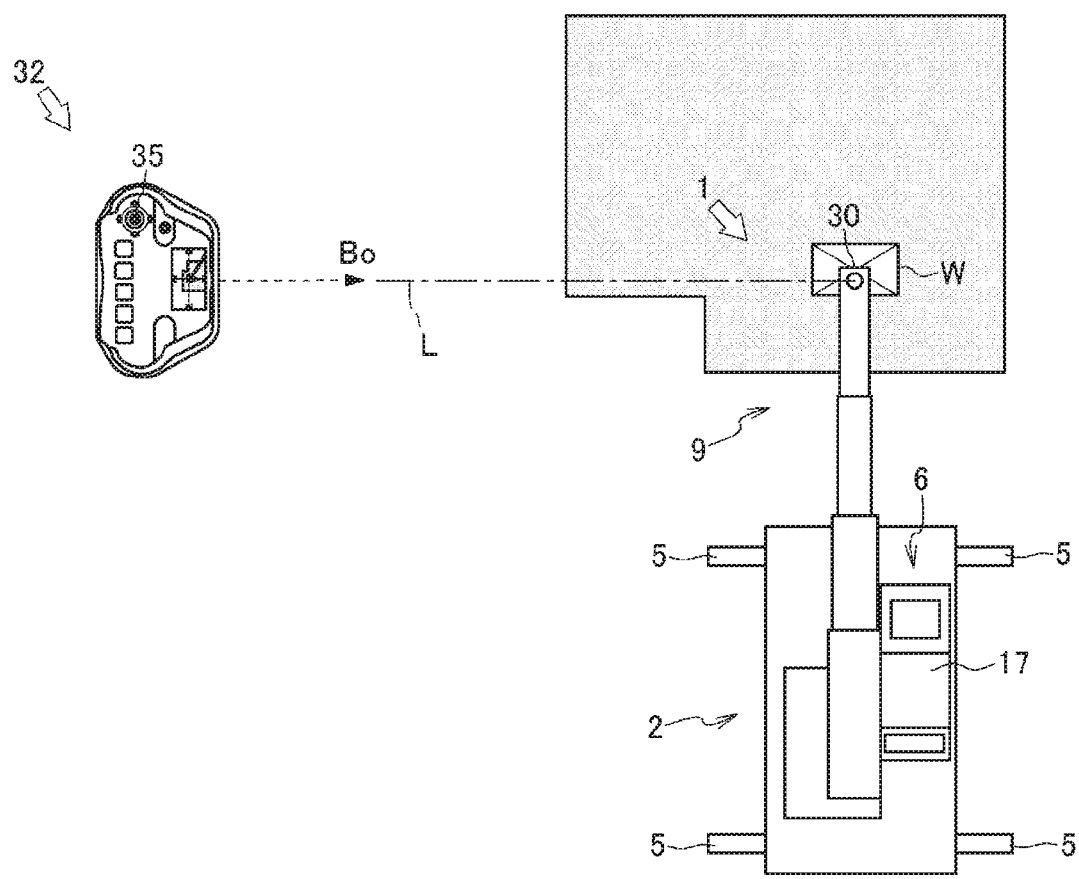
FIG. 6 is a schematic view illustrating the positional relationship between the remote operation terminal and the crane.

As illustrated in FIG. 6, it is assumed that crane 1 is remotely operated by an operator, who is holding remote operation terminal 32, from a position that is on a line that extends on the left side of the distal end of boom 9 in plan view and that is perpendicular to boom 9. Terminal-side control apparatus 43 of remote operation terminal 32 (see FIG. 4) obtains the positional coordinates of the distal end of boom 9 from control apparatus 31 of crane 1 (see FIG. 2) via communication device 22. Moreover, terminal-side control apparatus 43 calculates operation direction reference Bo along line L that connects between the obtained positional coordinates of the distal end of boom 9 and the positional coordinates of remote operation terminal 32. Terminal-side control apparatus 43 sets the calculated direction of operation direction reference Bo as the upward direction of remote operation terminal 32. By setting so, when suspended-load movement manipulation tool 35 is manipulated to incline in the upward direction, remote operation terminal 32 transmits a control signal such that the distal end of boom 9 (load W) moves along line L that connects between the positional coordinates of the distal end of boom 9 and the positional coordinates of remote operation terminal 32, which is operation direction reference Bo, in a direction away from remote operation terminal 32.

Figure 7:
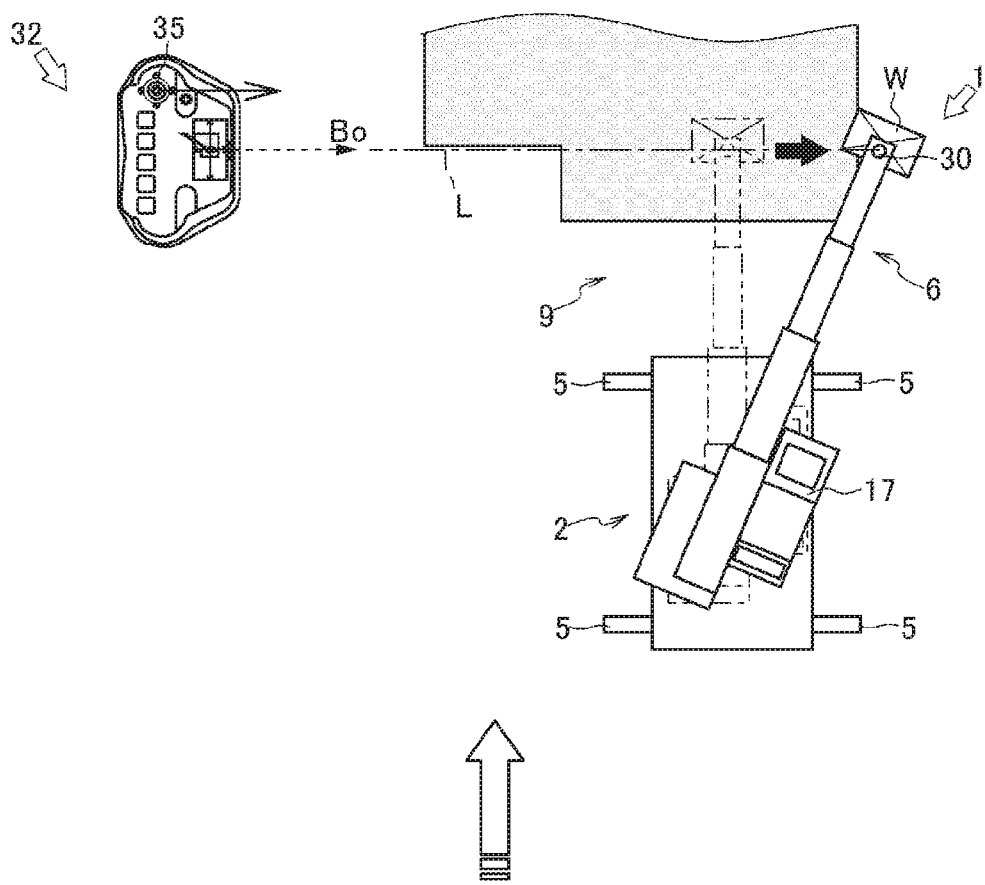
FIG. 7 is a schematic view illustrating a mode of remote operation when the upward direction on the remote operation terminal is directed toward the distal end of a boom of the crane.
Figure 7:
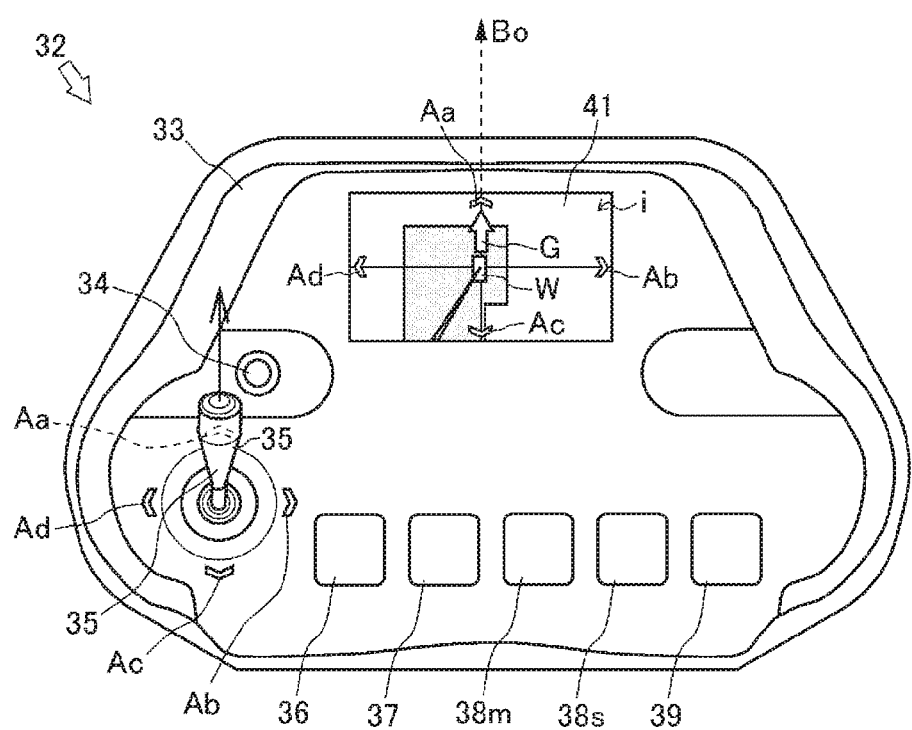

As illustrated in FIG. 7, when the upward direction of remote operation terminal 32 is directed toward the distal end of boom 9 of crane 1, for example, in a state in which an operator holding remote operation terminal 32 is facing in the direction toward the distal end of boom 9, the upward direction of remote operation terminal 32 substantially coincides with the direction of operation direction reference Bo. Accordingly, remote operation terminal 32 is set so that correction angle θ1 that is the angle between the upward direction of remote operation terminal 32 and operation direction reference Bo=0°. At this time, on display section 41 of remote operation terminal 32, the forward direction of reference figure G, which is an arrow indicating the direction of operation direction reference Bo, points toward arrow Aa. Moreover, on display section 41 of remote operation terminal 32, image i taken by camera 9b is displayed so that the direction of line L that connects between the positional coordinates of the distal end of boom 9 and the positional coordinates of remote operation terminal 32 in image i substantially coincides with the direction of operation direction reference Bo.

As an inclination manipulation in any direction of suspended-load movement manipulation tool 35 of remote operation terminal 32, when suspended-load movement manipulation tool 35 is manipulated to incline in the direction of arrow Aa, which is the upward direction of suspended-load movement manipulation tool 35 (see the arrow), terminal-side control apparatus 43 obtains, from a sensor (not shown) of suspended-load movement manipulation tool 35, an operation signal about inclination angle θ2 and inclination amount, where θ2 is the angle between the upward direction of remote operation terminal 32 and the inclination direction of the manipulation stick (in the present embodiment, θ2=0°). Moreover, terminal-side control apparatus 43 calculates, from the obtained operation signal and correction angle θ1 (in the present embodiment, θ1=0°), a control signal that moves the load W in the movement direction of movement angle θ of load W from operation direction reference Bo=correction angle θ1+inclination angle θ2=0°, that is, the direction of operation direction reference Bo and at a movement speed corresponding to the inclination amount. Remote operation terminal 32 generates, based on movement angle θ and the inclination amount calculated by terminal-side control apparatus 43, control signals of corresponding swivel valve 23, extension/retraction valve 24, luffing valve 25, main valve 26m, and sub-valve 26s, and transmits the control signals to crane 1 via terminal-side communication device 42.

Crane 1 moves load W along operation direction reference Bo in the rightward direction away from remote operation terminal 32 (see the solid black arrow). That is, remote operation terminal 32 transmits the control signals so that crane 1 transports load W in a direction that is the same as the inclination manipulation direction of suspended-load movement manipulation tool 35, when the upward direction of remote operation terminal 32 substantially coincides with the direction of line L that connects between the positional coordinates of the distal end of boom 9 and the positional coordinates of remote operation terminal 32 (when correction angle θ1=0°).

Figure 8:
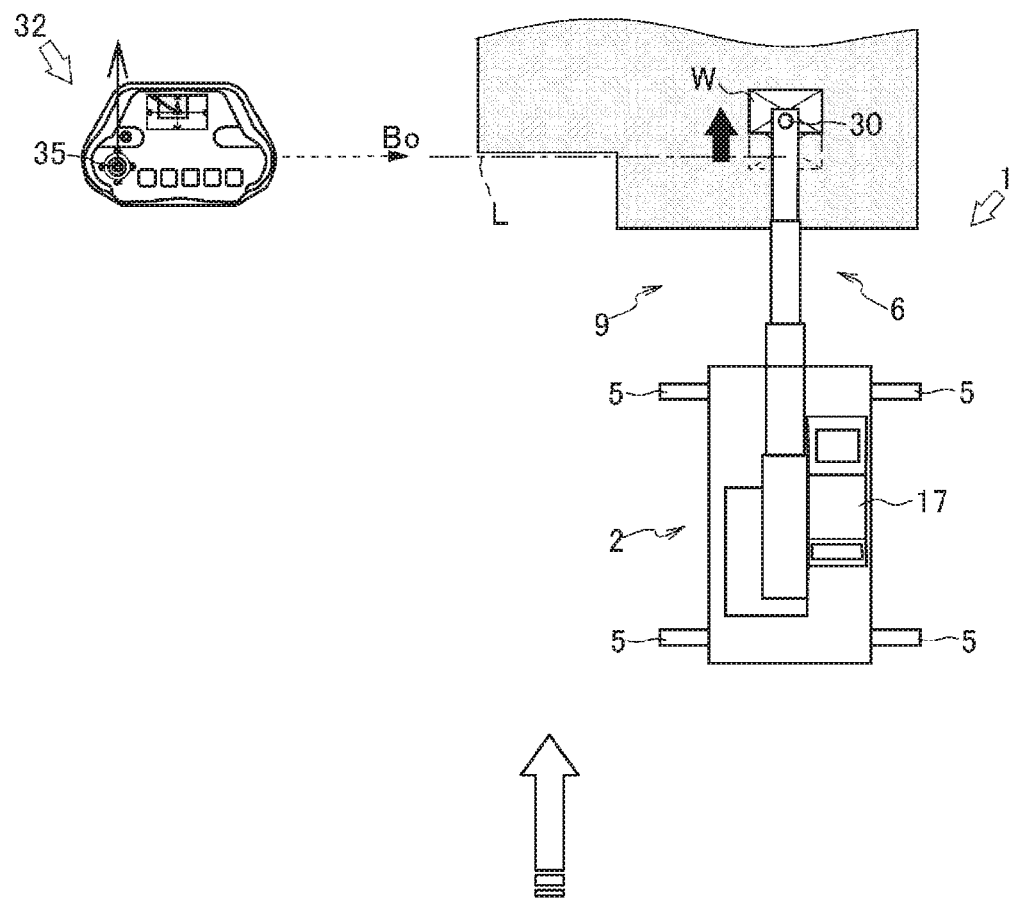
FIG. 8 is a schematic view illustrating a mode of remote operation when the upward direction on the remote operation terminal is directed toward the forward direction of the crane.
Figure 8:
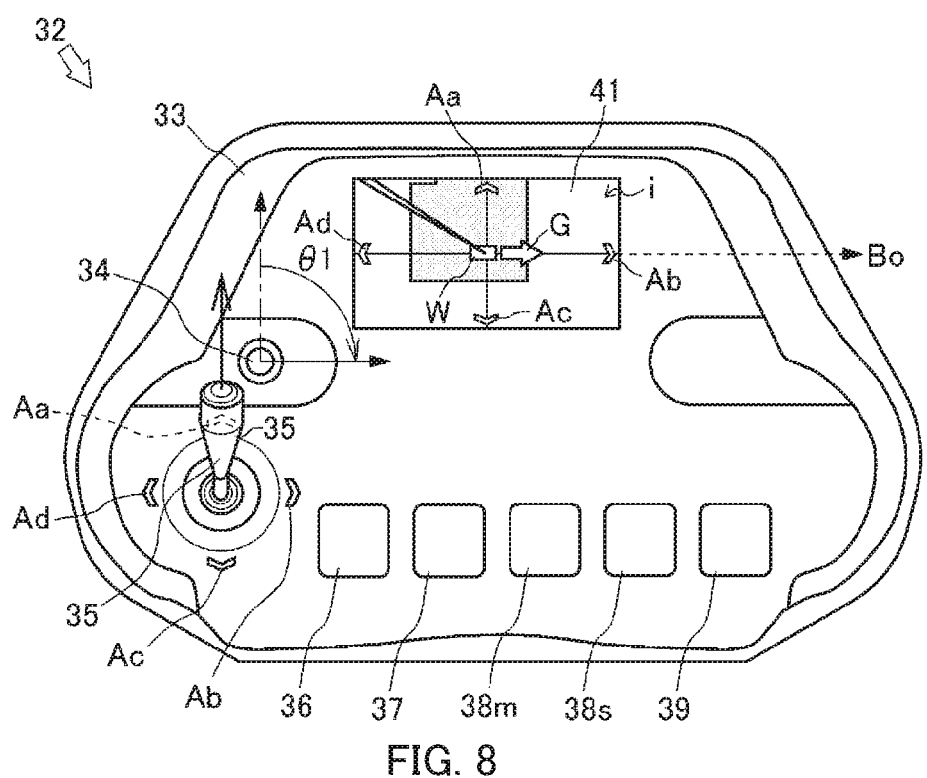

As illustrated in FIG. 8, in a state in which the upward direction of remote operation terminal 32 is directed in the forward direction of crane 1, when reference-change manipulation tool 34 is rotationally manipulated by correction angle θ1 (substantially 90°) in the clockwise direction, remote operation terminal 32 corrects the direction of operation direction reference Bo to a position that is rotated from the upward direction of remote operation terminal 32 in the clockwise direction by correction angle θ1. That is, in remote operation terminal 32, operation direction reference Bo is set at the position that is rotated from the upward direction of remote operation terminal 32 in the clockwise direction by correction angle θ1. At this time, on display section 41 of remote operation terminal 32, the forward direction of reference figure G, which is an arrow indicating the direction of operation direction reference Bo, is displayed so as to point to arrow Ab that is rotated from arrow Aa in the clockwise direction by correction angle θ1. Moreover, on display section 41 of remote operation terminal 32, in correspondence with the rotational operation of reference-change manipulation tool 34, image i taken by camera 9b is displayed so as to be rotated from the upward direction of remote operation terminal 32 in the clockwise direction by correction angle θ1. Image i has been rotated to a state in which the direction of line L coincides with the direction of operation direction reference Bo of remote operation terminal 32, from a state in which the direction of line L that connects between the positional coordinates of the distal end of boom 9 and the positional coordinates of remote operation terminal 32 in image i is displayed so as to coincide with the upward direction of remote operation terminal 32.

As an inclination manipulation in any direction of suspended-load movement manipulation tool 35 of remote operation terminal 32, when suspended-load movement manipulation tool 35 is manipulated to incline in the direction of arrow Aa, which is the upward direction of suspended-load movement manipulation tool 35 (see the arrow), terminal-side control apparatus 43 obtains, from a sensor (not shown) of suspended-load movement manipulation tool 35, an operation signal about inclination angle θ2 and inclination amount, where θ2 is the angle between the upward direction of remote operation terminal 32 and the inclination direction of the manipulation stick (in the present embodiment, θ2=0°). Moreover, terminal-side control apparatus 43 calculates, from the obtained operation signal and correction angle θ1, a control signal that moves the load W in the direction of movement angle θ of load W from operation direction reference Bo=correction angle θ1+inclination angle θ2=θ1 at a movement speed corresponding to the inclination amount. That is, terminal-side control apparatus 43 calculates a control signal that moves load W in a direction that is in the counterclockwise direction by the movement angle θ=θ1 from the direction of line L that connects between the positional coordinates of the distal end of boom 9 and the positional coordinates of remote operation terminal 32 at a movement speed corresponding to the inclination amount. Remote operation terminal 32 generates, based on movement angle θ and the inclination amount calculated by terminal-side control apparatus 43, control signals of corresponding swivel valve 23, extension/retraction valve 24, tufting valve 25, main valve 26m, and sub-valve 26s, and transmits the control signals to crane 1 via terminal-side communication device 42.

Crane 1 moves load W in the forward direction that is a direction at correction angle θ1 from operation direction reference Bo (see the solid black arrow). That is, remote operation terminal 32 can generate, when the upward direction of remote operation terminal 32 does not coincide with the direction of operation direction reference Bo, which is line L that connects between the positional coordinates of the distal end of boom 9 and the positional coordinates of remote operation terminal 32, the control signals so that crane 1 transports load W in a direction that is the same as the inclination manipulation direction of suspended-load movement manipulation tool 35, by causing operation direction reference Bo to coincide with the upward direction of remote operation terminal 32 by using reference-change manipulation tool 34.

Crane 1 is configured as described above so that, when an operator manipulates to incline suspended-load movement manipulation tool 35 in a state in which the operator is directing remote operation terminal 32 toward the distal end of boom 9 of crane 1, the distal end of boom 9 moves in the manipulation direction. Therefore, the operator does not fail to recognize the working direction of crane 1 with respect to the manipulation direction of suspended-load movement manipulation tool 35 during a remote operation. Remote operation terminal 32 is configured so that the direction of operation direction reference Bo of remote operation terminal 32 is set in a direction that an operator desires, and crane 1 is caused to work in accordance with the manipulation direction of suspended-load movement manipulation tool 35. Therefore, the operator can easily operate crane 1 in consideration of surrounding situations and operation conditions. Moreover, remote operation terminal 32 is configured so that image i from the distal end of boom 9 is displayed in alignment with the direction of operation direction reference Bo in remote operation terminal 32. Therefore, even when checking image i, the operator does not fail to recognize the working direction of crane apparatus 6 with respect to the manipulation direction of suspended-load movement manipulation tool 35 during a remote operation. Thus, a misoperation during a remote operation of crane 1 can be prevented, and the remote operation of crane 1 can be performed easily and simply.

In the present embodiment, in an indoor space or the like where a GNSS receiver cannot receive radio wave, a vector from an operator to the distal end of boom 9 may be calculated by IMES, wireless LAN, near field communication, image recognition, or the like. Instead of a GNSS receiver, in a space coordinate due to 3D mapping, the vector from an operator to the distal end of boom 9 may be calculated. Instead of image i taken by camera 9*b*, a space image formed by 3D mapping may be displayed.

The embodiment described above is only a representative example, and may be carried in various modifications within the range of the spirit of the embodiment. It is clear that the present invention can be carried out in various embodiments, the scope of the present invention is shown by the descriptions in claims, and the scope includes all modifications within the descriptions of the claims and equivalents thereof.

INDUSTRIAL APPLICABILITY

The present invention is applicable to a remote operation terminal and a mobile crane including the remote operation terminal.

REFERENCE SIGNS LIST

1 Crane
6 Crane apparatus
9 Extension/retraction boom
30 GNSS receiver
31 Control apparatus
32 Remote operation terminal
34 Reference-change manipulation tool
35 Suspended-load movement manipulation tool
40 Terminal-side GNSS receiver
43 Terminal-side control apparatus

The invention claimed is:
1. A remote operation terminal of a mobile crane including a GNSS receiver that receives a range signal from a GNSS satellite and calculates a present position of a distal end of a boom, the remote operation terminal comprising:
a housing comprising an operation panel;
a terminal-side GNSS receiver, provided to the housing, that receives a range signal from the GNSS satellite and calculates a present position of the remote operation terminal;
a suspended-load movement manipulation tool that comprises a stick standing vertically on the operation panel and configured to be capable of being manipulated to incline in any manipulation direction and that remotely operates the mobile crane based on an operation direction reference;
a reference-change manipulation tool that comprises a knob protruding from the operation panel and configured to be rotationally operable in any manipulation direction and that changes a direction of the operation direction reference by a rotational operation of the knob prior to a remote operation for the mobile crane; and
a control section, provided in the housing, that obtains the present position of the distal end of the boom and the present position of the remote operation terminal, sets the operation direction reference to a direction that connects between the present position of the remote operation terminal and the present position of the distal end of the boom, and calculates a working direction based on an angle between the manipulation direction of the manipulation tool and a direction of the operation direction reference, the working direction being a direction in which the distal end of the boom is to move linearly in plan view,
wherein the mobile crane includes a camera that is provided at the distal end of the boom and that takes an image of surroundings of the mobile crane,
wherein the control section
displays the image on a display of the remote operation terminal in a direction of the operation direction reference in the image taken by the camera coinciding with an upward direction of the remote operation terminal based on the setting of the operation direction reference, and
rotates the image displayed in the direction of the operation direction reference coinciding with the upward direction of the remote operation terminal to the direction of the operation direction reference in the image taken by the camera coinciding with a straight line that connects between the present position of the remote operation terminal and the present position of the distal end of the boom based on the reference-change manipulation tool being rotationally manipulated in the manipulation direction, and
wherein the control section is implemented via at least one processor.

2. The remote operation terminal according to claim 1, wherein:
in a case where an operation direction of the manipulation tool and the direction of the operation direction reference coincide with each other, the working direction of the distal end of the boom is calculated to the direction of the operation direction reference.

3. The remote operation terminal according to claim 1, wherein:
in a case where an operation direction of the manipulation tool and the direction of the operation direction reference do not coincide with each other, the working direction of the distal end of the boom is calculated to the direction of the operation direction reference resulting from rotation that makes the direction of the operation direction reference coincide with the operation direction of the manipulation tool.

4. The remote operation terminal according to claim 1, wherein:
the stick of the suspended-load movement manipulation tool is provided at a position spaced apart from the display on the operation panel; and
the knob of the reference-change manipulation tool is provided at a position closer to the display on the operation panel compared to the stick.

5. A mobile crane that is remotely operated by a remote operation terminal, the mobile crane comprising:
a GNSS receiver that receives a range signal from a GNSS satellite and calculates a present position of a distal end of a boom;
the remote operation terminal including:
a housing comprising an operation panel;
a suspended-load movement manipulation tool that comprises a stick standing vertically on the operation panel and configured to be capable of being manipulated to incline in any manipulation direction and that remotely operates the mobile crane based on an operation direction reference;
a reference-change manipulation tool that comprises a knob protruding from the operation panel and configured to be rotationally operable in any manipulation direction and that changes a direction of the operation direction reference by a rotational operation of the knob prior to a remote operation for the mobile crane;
a terminal-side GNSS receiver, provided in the housing, that receives a range signal from a GNSS satellite and calculates a present position of the remote operation terminal; and
a control section, provided in the housing, that sets the operation direction reference to a direction that connects between the present position of the remote operation terminal and the present position of the distal end of the boom, and calculates a working direction based on an angle between the manipulation direction of the manipulation tool and a direction of the operation direction reference, the working direction being a direction in which the distal end of the boom is to move linearly in plan view;
a control apparatus that controls a working of the mobile crane based on an operation signal with reference to the operation direction reference that is obtained from the remote operation terminal such that the distal end of the boom moves linearly in the working direction in plan view; and
a camera that is provided at the distal end of the boom and that takes an image of surroundings of the mobile crane,
wherein the control section
displays the image displayed on a display of the remote operation terminal in a direction of the operation direction reference in the image taken by the camera coinciding with an upward direction of the remote operation terminal based on the setting of the operation direction reference, and
rotates the image displayed in the direction of the operation direction reference coinciding with the upward direction of the remote operation terminal to the direction of the operation direction reference in the image taken by the camera coinciding with a straight line that connects between the present position of the remote operation terminal and the present position of the distal end of the boom based on the reference-change manipulation tool being rotationally manipulated in the manipulation direction, and
wherein the control section and the control apparatus are each implemented via at least one processor.

6. The mobile crane according to claim 5, wherein:
the stick of the suspended-load movement manipulation tool is provided at a position spaced apart from the display on the operation panel; and
the knob of the reference-change manipulation tool is provided at a position closer to the display on the operation panel compared to the stick.

* * * * *